Nov. 7, 1961     D. F. WILLCOX     3,008,135
AUXILIARY INDICATING LIGHT ASSEMBLY
Filed Nov. 12, 1959     2 Sheets-Sheet 1
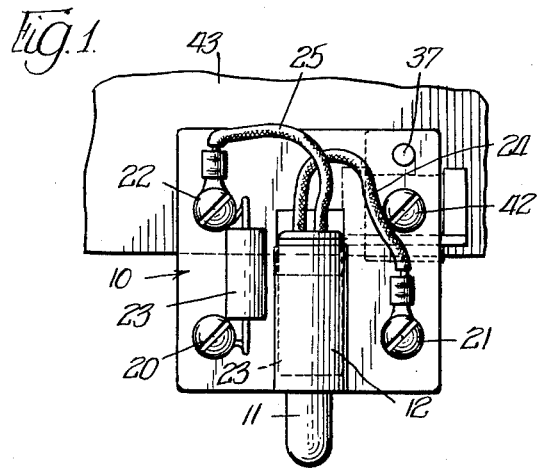
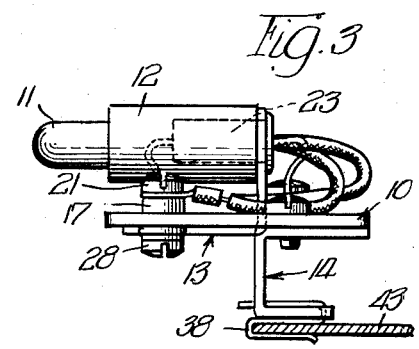
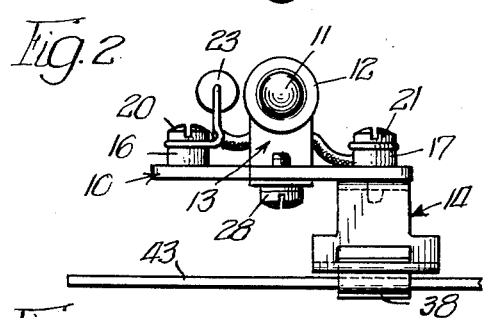
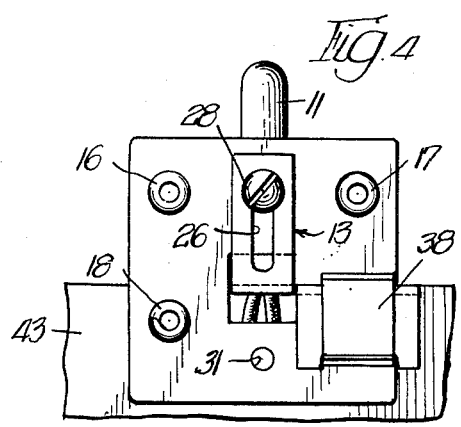
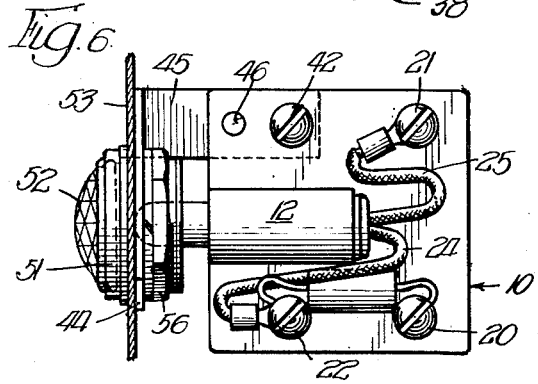
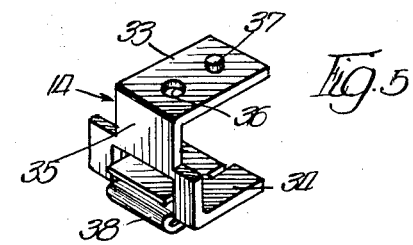
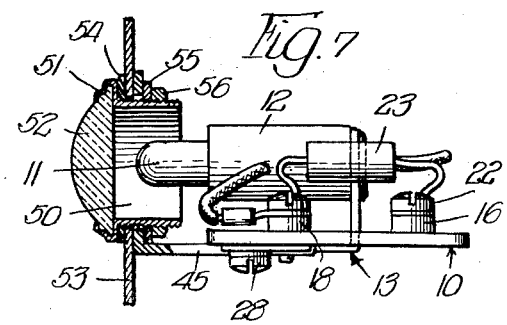
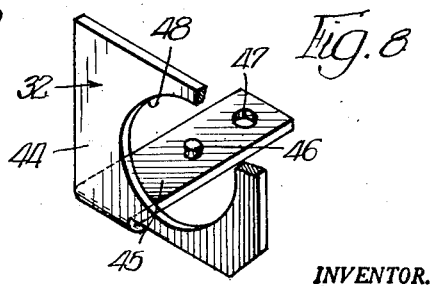
INVENTOR.
Dale F. Willcox,
BY
Byron Hume Groen & Clement
attys.

Nov. 7, 1961  D. F. WILLCOX  3,008,135
AUXILIARY INDICATING LIGHT ASSEMBLY
Filed Nov. 12, 1959  2 Sheets-Sheet 2
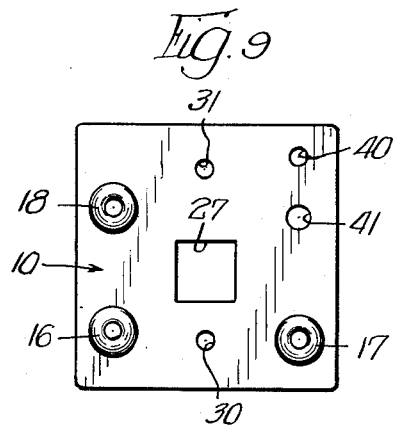
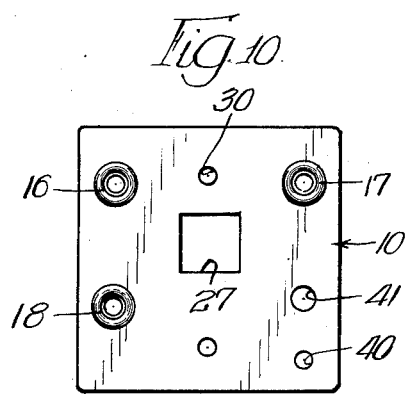
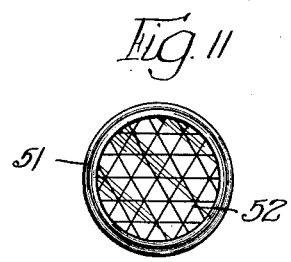
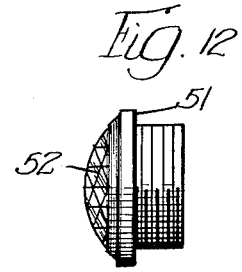
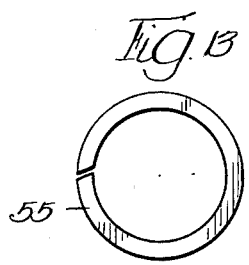
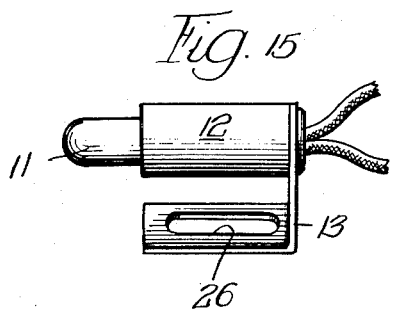
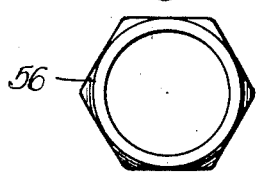
INVENTOR.
Dale F. Willcox,
BY
Byron, Hume, Groen & Clement
Attys

United States Patent Office 3,008,135
Patented Nov. 7, 1961

3,008,135
AUXILIARY INDICATING LIGHT ASSEMBLY
Dale F. Willcox, Aurora, Ill., assignor to Furnas Electric Company, Batavia, Ill., a corporation of Delaware
Filed Nov. 12, 1959, Ser. No. 852,426
3 Claims. (Cl. 340—381)

The invention relates to pilot light assemblies for installation on electric motor starters and other controls, and has reference in particular to an insulating terminal member for a pilot light and wherein the pilot light may be adjustably secured to said terminal member in at least two different positions to adapt the member for installation on the hinged cover or on the removable cover of an electric control box, for example.

In providing an insulating terminal member for the pilot light assembly of the invention, a central opening is formed in the terminal member in order that the pilot light may be located on the member in either of two positions one hundred and eighty degrees opposed to each other. An additional object with respect to the insulating terminal member resides in the provision of a lens assembly for association with the pilot light in a manner to releasably secure the pilot light to the cover of the electric motor starter or other control device.

A further object of the invention is to provide openings in an insulating terminal member such as described and which are located on the member in a novel arrangement for accommodating various attaching brackets, so that the member can be mounted in various positions on a supporting plate or similar supporting surface.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

FIGURE 1 is a top plan view of a pilot light assembly embodying the improved features of the invention;

FIGURE 2 is a front elevational view of the pilot light assembly of FIGURE 1;

FIGURE 3 is a side elevational view of the pilot light assembly of FIGURE 1;

FIGURE 4 is a bottom plan view illustrating the manner of attaching the insulating terminal member of the assembly to the edge of a supporting plate;

FIGURE 5 is a perspective view of an attaching bracket for use with the insulating terminal member;

FIGURE 6 is a top plan view of the pilot light showing the same in combination with a lens assembly and wherein the pilot light is supported thereby from the cover of a control box;

FIGURE 7 is a side elevational view of the pilot light assembly of FIGURE 6 with the lens and its mounting bracket being shown in section;

FIGURE 8 is a perspective view of the mounting bracket for the lens;

FIGURE 9 is a top plan view of the insulating terminal member;

FIGURE 10 is a bottom plan view of the insulating terminal member;

FIGURE 11 is a front elevational view of the lens;

FIGURE 12 is a side elevational view of the lens;

FIGURE 13 is an elevational view of the ring washer for use in mounting the lens;

FIGURE 14 is an elevational view of the securing nut for the lens; and

FIGURE 15 is a perspective view of the unit including the pilot light and its supporting bracket.

Referring to the drawings, the improved pilot light assembly of the invention essentially consists of a terminal member or plate 10 formed of insulating material, a pilot light unit including the light bulb 11, the socket 12 and its supporting bracket 13, and the attaching bracket designated by numeral 14 which releasably supports the pilot light assembly from a supporting plate or the like. The insulating terminal member 10 is approximately square in outline as shown in FIGURES 9 and 10 and the same has a thickness which may vary with its size, since the member should be thick enough for adequate strength. A plurality of metal terminals are securely fixed to the insulating member as by riveting and the same include the line terminals 16 and 17 and the intermediate terminal 18. The said terminals have associated therewith the threaded terminal screws 20, 21 and 22, respectively. A resistor 23 of a predetermined rating as regards its resistance in ohms is connected to the terminals 16 and 18 by the terminal screws 20 and 22. The conductors 24 and 25 electrically connect the pilot light unit to the terminals 17 and 18, and, accordingly, the resistor 23 is in series relation with the pilot light. The value of the resistor in ohms will be predetermined for different voltages to which the pilot light assembly may be connected and it is relatively easy to change the resistor as the installation for the assembly may be changed.

The pilot light unit has been described as including the light bulb 11, the socket 12 which is formed of insulating material, and the metal supporting bracket 13 which has a fixed securement to the said socket. For releasably attaching the pilot light unit to the insulating terminal member, the base leg of the bracket 13 is provided with an elongated slot 26 and the terminal member 10 is provided with an approximately square opening 27. The bracket 13 is associated with the terminal member 10 by inserting the base leg of the bracket 13 in opening 27 so that the base leg has contact with the underside of the terminal member as shown in FIGURE 4. The pilot light unit can be assembled on the member in two different positions one hundred and eighty degrees opposed. When the light projects from the edge of the member between the terminals 16 and 17, see FIGURE 1, the securing screw 28 passes through the slot 26 and is threaded into the threaded opening 30. When the pilot light unit is associated with the member so that the bulb projects from the edge adjacent terminal member 18, as best shown in FIGURE 6, then the securing screw 28 passes through the slot 26 and has threaded relation in the threaded opening 31.

It will be understood that the pilot light unit is generally associated with a bull's eye type of lens. The lens functions to diffuse the light beam and to produce a light source which is readily visible to the operator. Accordingly, the pilot light assembly is adapted to be clipped to the edge of a supporting plate for association with its bull's eye type of lens when the said lens is supported by other means. FIGURES 1 to 5, inclusive, illustrate a preferred type of attaching bracket which may be used for this purpose. However, when the pilot light assembly is supported by its lens as in FIGURES 6 and 7 the mounting bracket 32 of FIGURE 8 is employed.

The attaching bracket 14 is shown in perspective in FIGURE 5. The bracket is approximately U-shaped, having a top leg 33, a bottom leg 34 and an intermediate connection portion 35. The top leg 33 is provided with the threaded opening 36 and with the positioning lug 37 which projects upwardly from the top surface of the said leg. The bottom leg 34 is provided with the spring clip 38. For accommodating the attaching bracket the insulating terminal member 10 is formed with a pair of openings indicated by the numerals 40 and 41, FIG- URE 10. Opening 40 is adapted to receive the positioning lug 37 and when the parts are properly aligned the securing screw 42, FIGURE 1, passes through opening 41 for threaded securement in opening 36. When the screw is tightened the attaching bracket 14 and terminal member 10 are securely united and the connected parts comprise the pilot light assembly. The resilient clip 38 of the attaching bracket enables the assembly to be releasably clipped to the edge of a supporting plate such as 43 which may comprise the lower wall of a control box or similar apparatus. When the attaching bracket is secured to the terminal member as described, it is generally preferred that the light bulb project from the edge of the member adjacent the line terminals 16 and 17. This positioning of the parts is shown in FIGURE 1, and thus the bracket 13 is so associated with the terminal member that the securing screw 28 passes through slot 26 and has threaded connection in opening 30, FIGURE 9.

In FIGURES 6 and 7 the pilot light unit is shown in an opposed position from that of FIGURE 1 and for supporting the terminal member in this modification the mounting bracket 32 is employed instead of the attaching bracket 14. The said mounting bracket 32 essentially consists of a front plate 44 having a rearwardly extending leg member 45 integral therewith and disposed adjacent one side of the plate 44. As described with respect to the attaching bracket 14, said leg member 45 has a positioning lug 46 and a threaded opening 47. The plate 44 is formed with the large center opening 48. The terminal member and the mounting bracket can be easily assembled since the positioning lug 46 is adapted to enter opening 40 in the member, and the securing screw 42 passes through opening 41 and has threaded relation in threaded opening 47. Accordingly, in this modification of the invention the insulating terminal member 10 and the mounting bracket 32 comprise the pilot light assembly.

The lens for association with the pilot light is best shown in FIGURES 7 and 12 where it will be observed that the tubular body portion 50 is exteriorly threaded and said body portion has formed integral therewith the rim 51 which functions to maintain the lens 52 in place and in connected relation with the body portion. The plate 53, such as the cover of a control box, which is adapted to receive the lens assembly, is formed with a large opening through which the body portion 50 of the lens is inserted. It is desired to position a rubber gasket such as 54 between the rim 51 and the outer surface of the plate 53. The plate 44 of the mounting bracket is located on the body portion 50 of the lens and disposed adjacent the inside surface of the plate 53. The split ring washer 55 is then telescoped onto the body portion 50 and the parts are securely held by the hexagonal locking washer 56. Accordingly, the mounting bracket 32 is securely held to the plate 53 by the same elements which attach the lens assembly to the plate. Since the terminal member is secured to the mounting bracket in a position as determined by the positioning lug 46 and threaded opening 47, it will be understood that the light bulb unit is properly oriented with respect to the lens 52, being positioned approximately centrally within the body portion 50. To adjust the light bulb either towards or from the lens 52 it is only necessary to release the securing screw 28 and move the bracket 13 either forward or backward as permitted by the elongated slot 26.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a pilot light assembly, in combination, a terminal member of insulating material, a pilot light unit including a light bulb, a socket for receiving the light bulb and a supporting bracket for the socket, said terminal member having an opening approximately centrally thereof for receiving the supporting bracket in either of two positions and which are one hundred and eighty degrees opposed, a plurality of terminals fixed to the terminal member, a second bracket adapted to be releasably secured to the terminal member for supporting the same, said second bracket having a positioning lug and a threaded opening, and said terminal member having a pair of openings for receiving the positioning lug and for receiving a threaded screw respectively, said threaded screw having threaded relation with the threaded opening in the second bracket.

2. In a pilot light assembly, in combination, a terminal member of insulating material, a pilot light unit including a light bulb, a socket for receiving the light bulb and a supporting bracket for the socket, said supporting bracket having one leg thereof formed with an elongated slot, said terminal member having an opening approximately centrally thereof for receiving the supporting bracket in either of two positions and which are one hundred and eighty degrees opposed, a securing screw for insertion in the elongated slot and adapted to be threadedly secured to the terminal member for releasably and adjustably securing the bracket to the terminal member, a plurality of terminals fixed to the terminal member, a second bracket adapted to be releasably secured to the terminal member for supporting the same, said second bracket having a positioning lug and a threaded opening, and said terminal member having a pair of openings for receiving the positioning lug and for receiving a threaded screw respectively, said threaded screw having threaded relation with the threaded opening in the second bracket.

3. In a pilot light assembly, in combination, a substantially flat terminal member of insulating material, a pilot light unit including a light bulb, a socket for receiving the light bulb and a supporting bracket for the socket, said supporting bracket having one leg thereof formed with an elongated slot, said terminal member having an opening approximately centrally thereof for receiving said leg of the supporting bracket in either of two positions and which are one hundred and eighty degrees opposed, a securing screw located in the elongated slot and being threadedly secured to the terminal member for releasably and adjustably securing the bracket to the terminal member, a plurality of terminals fixed to the terminal member, and said terminal member having a pair of openings for accommodating a second bracket for supporting the pilot light assembly.

References Cited in the file of this patent

UNITED STATES PATENTS

| | | |
|---|---|---|
| 2,175,844 | Laystrom | Oct. 10, 1939 |
| 2,536,710 | Baker | Jan. 2, 1951 |
| 2,545,508 | Allen | Mar. 20, 1951 |
| 2,610,816 | Vote | Sept. 16, 1952 |
| 2,757,889 | Cady | Aug. 7, 1956 |
| 2,774,860 | Prebol | Dec. 18, 1956 |
| 2,784,398 | Mysse | Mar. 5, 1957 |
| 2,786,196 | Haynes | Mar. 19, 1957 |
| 2,872,139 | Bedford | Feb. 3, 1959 |

FOREIGN PATENTS

| | | |
|---|---|---|
| 1,037,201 | France | Apr. 29, 1953 |